(12) United States Patent
Wu et al.

(10) Patent No.: US 8,937,975 B1
(45) Date of Patent: Jan. 20, 2015

(54) APPARATUS AND METHOD FOR PROVIDING PRE-EMPHASIS TO A SIGNAL

(71) Applicant: Marvell International Ltd., Hamilton (BM)

(72) Inventors: Lei Wu, Sunnyvale, CA (US); Timothy Hu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/101,502

(22) Filed: Dec. 10, 2013

Related U.S. Application Data

(63) Continuation of application No. 13/675,577, filed on Nov. 13, 2012, now Pat. No. 8,605,759, which is a continuation of application No. 12/792,247, filed on Jun. 2, 2010, now Pat. No. 8,311,064, which is a continuation of application No. 11/904,886, filed on Sep. 28, 2007, now Pat. No. 7,733,920, which is a continuation of application No. 10/277,449, filed on Oct. 22, 2002, now Pat. No. 7,319,705.

(51) Int. Cl.
*H04L 27/00* (2006.01)
*G06F 13/40* (2006.01)
*H04L 25/03* (2006.01)
*H04L 25/02* (2006.01)

(52) U.S. Cl.
CPC ...... *G06F 13/4072* (2013.01); *H04L 25/03025* (2013.01); *H04L 25/0292* (2013.01)
USPC ....... 370/532; 370/395.62; 370/535; 375/354

(58) Field of Classification Search
CPC ............................ H04L 25/00; G06F 13/4072
USPC ........... 370/395–62, 532–539; 375/224, 233, 375/259, 295, 354
See application file for complete search history.

(56) References Cited

U.S. PATENT DOCUMENTS

| | | | |
|---|---|---|---|
| 4,456,965 A | 6/1984 | Graber et al. |
| 4,747,047 A | 5/1988 | Coogan et al. |
| 5,210,855 A | 5/1993 | Bartol |
| 5,220,275 A | 6/1993 | Holmqvist |
| 5,222,062 A | 6/1993 | Sharma et al. |
| 5,274,665 A | 12/1993 | Schilling |

(Continued)

FOREIGN PATENT DOCUMENTS

| | | |
|---|---|---|
| EP | 0876016 | 11/1998 |
| GB | 2 408 624 A | 3/2004 |

OTHER PUBLICATIONS

Serial ATT II; Extensions to Serial ATA, 1.0, Revision 1.0, Oct. 16, 2002, APT Technologies, Inc., Dell Computer Corporation, Intel Corporation, Maxtor Corporation, Seagate Technology.

(Continued)

*Primary Examiner* — Afsar M Qureshi

(57) ABSTRACT

A circuit including delay stages, gain stages, and a summer. The delay stages are configured to provide delayed versions of a first signal. The gain stages are configured to receive the delayed versions of the first signal. Each of the gain stages provides an amount of gain for a corresponding one of the delayed versions of the first signal. The delay stages and the gain stages are configured to provide pre-emphasis to the first signal. The summer is configured to output a second signal based on the delayed versions of the first signal. The second signal includes the pre-emphasis.

20 Claims, 8 Drawing Sheets

(56) References Cited

U.S. PATENT DOCUMENTS

| | | | |
|---|---|---|---|
| 5,331,646 A | 7/1994 | Krueger et al. | |
| 5,446,767 A | 8/1995 | Nakagawa et al. | |
| 5,471,152 A | 11/1995 | Gheewala et al. | |
| 5,471,585 A | 11/1995 | Barakat et al. | |
| 5,553,230 A | 9/1996 | Petersen et al. | |
| 5,564,114 A | 10/1996 | Popat et al. | |
| 5,661,765 A | 8/1997 | Ishizu | |
| 5,748,645 A | 5/1998 | Hunter et al. | |
| 5,783,960 A | 7/1998 | Lackey | |
| 5,787,485 A | 7/1998 | Fitzgerald et al. | |
| 5,802,318 A | 9/1998 | Murray et al. | |
| 5,812,754 A | 9/1998 | Lui et al. | |
| 5,826,048 A | 10/1998 | Dempsey et al. | |
| 5,828,854 A | 10/1998 | Wade | |
| 5,848,278 A | 12/1998 | Sakai | |
| 5,854,941 A | 12/1998 | Ballard et al. | |
| 5,886,901 A | 3/1999 | Magoshi | |
| 5,894,560 A | 4/1999 | Carmichael et al. | |
| 5,909,451 A | 6/1999 | Lach et al. | |
| 6,009,275 A | 12/1999 | DeKoning et al. | |
| 6,021,462 A | 2/2000 | Minow et al. | |
| 6,057,863 A | 5/2000 | Olarig | |
| 6,059,836 A | 5/2000 | Liguori | |
| 6,073,188 A | 6/2000 | Fleming | |
| 6,092,169 A | 7/2000 | Murthy et al. | |
| 6,106,568 A | 8/2000 | Beausang et al. | |
| 6,124,727 A | 9/2000 | Bridgewater et al. | 326/33 |
| 6,178,215 B1 | 1/2001 | Zhang et al. | |
| 6,223,238 B1 | 4/2001 | Meyer et al. | |
| 6,237,052 B1 | 5/2001 | Stolowitz | |
| 6,278,724 B1* | 8/2001 | Zhou et al. | 375/147 |
| 6,314,145 B1 | 11/2001 | van Driest | |
| 6,330,687 B1 | 12/2001 | Griffith et al. | |
| 6,363,439 B1 | 3/2002 | Battles et al. | |
| 6,367,033 B1 | 4/2002 | Jibbe | |
| 6,378,039 B1 | 4/2002 | Obara et al. | |
| 6,388,590 B1 | 5/2002 | Ng | 341/100 |
| 6,388,591 B1 | 5/2002 | Ng | 341/100 |
| 6,442,722 B1 | 8/2002 | Nadeau-Dosic | |
| 6,447,340 B1 | 9/2002 | Wu | |
| 6,484,294 B1 | 11/2002 | Kiyoshige et al. | |
| 6,496,900 B1 | 12/2002 | McDonald et al. | |
| 6,549,981 B2 | 4/2003 | McDonald et al. | |
| 6,557,065 B1 | 4/2003 | Peleg et al. | |
| 6,564,271 B2 | 5/2003 | Micalizzi, Jr. et al. | |
| 6,578,126 B1 | 6/2003 | MacLellan et al. | |
| 6,614,842 B1 | 9/2003 | Chou et al. | |
| 6,662,076 B1 | 12/2003 | Conboy et al. | |
| 6,678,768 B1 | 1/2004 | Craft | |
| 6,687,775 B1* | 2/2004 | Bassett | 710/70 |
| 6,697,867 B1 | 2/2004 | Chong, Jr. | |
| 6,704,300 B1 | 3/2004 | Chen et al. | |
| 6,731,688 B1 | 5/2004 | Johnson | 375/257 |
| 6,791,779 B1 | 9/2004 | Singh et al. | |
| 6,792,494 B2 | 9/2004 | Bennett et al. | |
| 6,813,688 B2 | 11/2004 | Wu et al. | |
| 6,845,420 B2 | 1/2005 | Resnick | |
| 6,854,045 B2 | 2/2005 | Ooi et al. | |
| 6,898,655 B1 | 5/2005 | Sutardja | |
| 6,908,330 B2 | 6/2005 | Garrett et al. | |
| 6,915,380 B2 | 7/2005 | Tanaka et al. | |
| 6,917,992 B2 | 7/2005 | Grimsrud et al. | |
| 6,922,738 B2 | 7/2005 | Drescher et al. | |
| 6,928,509 B2 | 8/2005 | Surugucchi | |
| 6,961,813 B2 | 11/2005 | Grieff et al. | |
| 6,968,025 B2* | 11/2005 | Tanahashi | 375/355 |
| 6,978,337 B1 | 12/2005 | Chang | |
| 7,089,345 B1 | 8/2006 | Lynn | |
| 7,103,496 B2 | 9/2006 | Hong | 702/124 |
| 7,319,705 B1 | 1/2008 | Wu et al. | |
| 2002/0024975 A1 | 2/2002 | Hendler | |
| 2002/0067785 A1* | 6/2002 | Tanahashi | 375/354 |
| 2002/0159311 A1 | 10/2002 | Coffey et al. | |
| 2002/0173925 A1* | 11/2002 | Sugawara et al. | 702/107 |
| 2002/0186708 A1 | 12/2002 | Chren et al. | |
| 2003/0005231 A1 | 1/2003 | Ooi et al. | |
| 2003/0035504 A1 | 2/2003 | Wong et al. | |
| 2003/0074515 A1 | 4/2003 | Resnick | |
| 2003/0081743 A1 | 5/2003 | Chiang et al. | 379/93 |
| 2003/0135577 A1 | 7/2003 | Weber et al. | |
| 2003/0145264 A1 | 7/2003 | Siegel et al. | |
| 2003/0167367 A1 | 9/2003 | Kaushik et al. | |
| 2003/0236952 A1 | 12/2003 | Grieff et al. | |
| 2004/0015637 A1 | 1/2004 | Yau | |
| 2004/0024950 A1 | 2/2004 | Surugucchi | |
| 2004/0044802 A1 | 3/2004 | Chiang et al. | |
| 2004/0068591 A1 | 4/2004 | Workman et al. | |
| 2004/0081179 A1 | 4/2004 | Gregorcyk, Jr. | |
| 2004/0083323 A1 | 4/2004 | Rabinovitz et al. | |
| 2004/0083324 A1 | 4/2004 | Rabinovitz et al. | |
| 2004/0088441 A1 | 5/2004 | Chiang et al. | |
| 2004/0100944 A1 | 5/2004 | Richmond et al. | |
| 2004/0113662 A1 | 6/2004 | Grimsrud | |
| 2004/0117522 A1 | 6/2004 | Loffink et al. | |
| 2004/0120353 A1 | 6/2004 | Kim et al. | |
| 2004/0198104 A1 | 10/2004 | Hadba et al. | |
| 2004/0199515 A1 | 10/2004 | Penny et al. | |
| 2004/0203295 A1 | 10/2004 | Hadba et al. | |
| 2004/0205288 A1 | 10/2004 | Ghaffari et al. | |
| 2004/0240588 A1* | 12/2004 | Miller | 375/340 |
| 2004/0252672 A1 | 12/2004 | Nemazie | 370/351 |
| 2004/0252716 A1 | 12/2004 | Nemazie | |
| 2004/0264284 A1 | 12/2004 | Priborsky et al. | |
| 2005/0005216 A1 | 1/2005 | Chameshlu et al. | |
| 2005/0015655 A1 | 1/2005 | Clayton et al. | |
| 2005/0024083 A1 | 2/2005 | Kitzmura et al. | |
| 2005/0027894 A1 | 2/2005 | Ayyavu et al. | |
| 2005/0055501 A1 | 3/2005 | Guha et al. | |
| 2005/0144490 A1 | 6/2005 | Igari | |
| 2005/0186832 A1 | 8/2005 | Nemazie | 439/378 |
| 2005/0204078 A1 | 9/2005 | Steinmetz et al. | |
| 2005/0246475 A1 | 11/2005 | Ervin | |
| 2005/0251588 A1 | 11/2005 | Hoch et al. | |

OTHER PUBLICATIONS

RAID Anatomy 101; Alan Benway; Oct. 2000; 7 pages.

Taking a Ride on the Bus; Alan Benway; Apr. 2000; 5 pages.

Serial ATA Next Generation Storage Interface; Mark Kymin; Jun. 9, 2005; pp. 1-6.

SATA PHY Interface Specification (SAPIS) Draft—Rev 0.90; Intel Corporation; Feb. 8, 2002; pp. 1-12.

SATA Technology; www.sata-or.org; Dec. 15, 2004; 8 pages.

SATA v PATA; Sanjeeb Nanda, Computer Technology Review, Nov. 2002; p. 18.

SATA (FAQs); Seagate Technology LLC; 2005; 3 pages.

Serial ATA: High Speed Serialized AT Attachment; Revision 1.0a; Jan. 7, 2003; APT Technologies, Inc., Dell Computer Corporation, Intel Corporation, Maxtor Corporation, Seagate Technology; 311 pages.

Tempo Bridge G5 Serial ATA Interface to Parallel ATA Drive Adapter; Sonnet Technologies, Inc., Revised 2005; 3 pages.

Serial ATA in Servers and Networked Storage; 2002; 12 pages.

Serial ATA II: Port Multiplier, Revision 1.0, Mar. 25, 2003, APT Technologies, Inc., Dell Computer Corporation, Intel Corporation, Maxtor Corporation, Seagate Technology; 34 pages.

Serial ATA II Workgroup; Serial ATA II Specification Port Selector, Proposed Draft; Revision 1.0RC, Jun. 23, 2003; 21 pages.

Information Technology—AT Attachment with Packet Interface—6 (ATA/ATAPI-6), Working Draft, T13 1410D, Revision 3; Peter T. McLean; Oct. 30, 2001; 496 pages.

Serial ATA II: Port Selector, Revision 1.0, Jul. 28, 2003; Dell Computer Corporation, Intel Corporation, Maxtor Corporation, Seagate Technology, Vitesse Semiconductor Corporation; 20 pages.

"Serial ATA: High Speed Serialized AT Attachment", Serial ATA Organization, Revision 1.0, Aug. 29, 2001.

Supplements to "Serial ATA: High Speed Serialized AT Attachment", Serial ATA Organization, Revision 1.0, Aug. 29, 2001.

Errata to "Serial ATA: High Speed Serialized AT Attachment", Serial ATA Organization, Revision 1.0, Aug. 29, 2001.

* cited by examiner

APPARATUS AND METHOD FOR PROVIDING PRE-EMPHASIS TO A SIGNAL

CROSS-REFERENCE TO RELATED APPLICATIONS

The present disclosure is a continuation of U.S. patent application Ser. No. 13/675,577 (now U.S. Pat. No. 8,605,759), filed Nov. 13, 2012, which is a continuation of U.S. patent application Ser. No. 12/792,247 (now U.S. Pat. No. 8,311,064), filed on Jun. 2, 2010, which is a continuation of U.S. patent application Ser. No. 11/904,886 (now U.S. Pat. No. 7,733,920), filed Sep. 28, 2007, which is a continuation of U.S. patent application Ser. No. 10/277,449 (now U.S. Pat. No. 7,319,705), filed Oct. 22, 2002. The entire disclosures of the applications referenced above are incorporated herein by reference.

FIELD

The present disclosure relates to serial ATA communications channels, and more particularly to a programmable pre-emphasis circuit for a serial ATA communications channel.

BACKGROUND

A host and a device typically transmit and receive data to and from each other. For example in a personal computer environment, a disk drive controller (host) is often connected to a disk drive (device). Referring now to FIG. 1A, a host 10 includes a receiver 12 and a transmitter 14. A device 16 includes a receiver 18 and a transmitter 20. The transmitter 14 of the host 10 transmits host data 22 to the receiver 18 of the device 16. The transmitter 20 of the device 16 transmits device data 24 to the receiver 12 of the host 10. In the personal computer environment the host 10 can be a disk controller 10-1 and the device 16 can be a disk drive 16-1 as shown in FIG. 1B. Still other hosts and devices can be employed.

The host and the device are connected using a Serial Advanced Technology Attachment (SATA) standard, which is generally identified at 26. The SATA standard is a simplified packet switching network between a host and a device. SATA typically employs balanced voltage (differential) amplifiers and two pairs of wires that connect transmitters and receivers of the host 10 and the device 16 in a manner similar to 100BASE-TX Ethernet. The SATA standard is disclosed in "Serial ATA: High Speed Serialized AT Attachment", Serial ATA Organization, Revision 1.0, 29 Aug. 2001, and its Supplements and Errata, which are hereby incorporated by reference.

Referring now to FIG. 1C, a typical physical layer (PHY) 28 of the host 10 and/or the device 16 is shown generally at 29. An analog front end 30 provides an interface to the data transmission lines. The analog front end 30 includes differential drivers and receivers and/or out-of-band signaling circuits. A PHY control circuit 31 controls the functionality of the PHY 28. Fixed pattern source and detect circuits 32 and 33, respectively, are optional circuits that provide ALIGN primitives. The fixed pattern detect circuit 33 generates a COMMA signal when a K28.5 character is detected in the received data.

DataIn[0:n] and an output of the fixed pattern source 32 are input to a multiplexer 34. The PHY control circuit 31 controls the multiplexer 34. DataIn[0:n] includes data sent from the link layer to the PHY 28 for serialization and transmission. A data extraction circuit 35 separates the clock (RecClk clock signal) and data received by the receivers in the analog front end 30. The TxClk output from the control circuit 31 regulates the frequency of the serial stream. DataOut[0:n], which is passed to the link layer, includes data that is received and deserialized by the PHY 28. The SYSCLK signal is a reference clock signal that is used to establish the transmitter interface speed. Other control inputs and outputs generally identified by MISC in FIG. 1C are specified in the SATA standard.

Referring now to FIG. 2, the transmitter 14 of the host 10 or the transmitter 20 of the device 16 is shown. Differential data ($D(0)^+$ and $D(0)^-$) to be transmitted is received by differential inputs of a differential driving device 40. The differential driving device 40 creates a differential voltage ($V^+$ and $V^-$) by driving differential outputs ($i_o^+$ and $i_o^-$) through loads 42 and 44. A communications channel 46 transmits the differential voltage to the receiver 18 of the device 16 or to the receiver 12 of the host 10. The transmission characteristics of the communications channel 46 may attenuate or otherwise alter the signal that is received by the receiver at the opposite end of the communications channel 46, which may increase bit error rates.

Referring now to FIG. 3, the differential output voltage in an ideal communications channel 46 is shown. In FIG. 4, the differential output voltage of a band-limiting communications channel is shown, which is a typical characteristic of the communications channel 46. The transition from 0 to 1 to 0 creates an "eye"-shaped waveform that is generally identified at 48 in FIGS. 4 and 5. As the band-limiting transmission characteristic increases, the "eye" closes as shown by arrows 49, which makes the 0-1-0 transition more difficult to detect.

SUMMARY

A device is provided and includes a multiplexer, a control circuit, and a transmitter. The multiplexer is configured to (i) receive multiple signals, and (ii) generate an output signal based on a selected one of the signals. The output signal includes frequencies and has a respective signal magnitude at each of the frequencies. The control circuit is configured to determine gain values. The transmitter is configured to (i) provide pre-emphasis to the output signal to offset a characteristic of a channel, and (ii) transmit the output signal with the pre-emphasis on the channel. The transmitter, in providing the pre-emphasis to the output signal, is configured to: provide delayed versions of the output signal, where each of the delayed versions of the output signal has a different amount of delay than other ones of the delayed versions of the output signal; and amplify each of the delayed versions of the output signal based on a respective one of the gain values such that (i) the signal magnitudes at certain ones of the frequencies are amplified, and (ii) the signal magnitudes at other ones of the frequencies are attenuated.

In other features, a method is provided and includes receiving multiple signals and generating an output signal via a multiplexer based on a selected one of the signals. The output signal includes frequencies and has a respective signal magnitude at each of the frequencies. The method further includes determining gain values, providing pre-emphasis to the output signal to offset a characteristic of a channel, and transmitting the output signal with the pre-emphasis on the channel. The providing of the pre-emphasis to the output signal includes: providing delayed versions of the output signal, where each of the delayed versions of the output signal has a different amount of delay than other ones of the delayed versions of the output signal; and amplifying each of the delayed versions of the output signal based on a respective one of the gain values such that (i) the signal magnitudes at certain ones of the frequencies are amplified, and (ii) the signal magnitudes at other ones of the frequencies are attenuated.

A high-speed serial ATA physical layer according to the present disclosure transmits data over a communications medium using a serial ATA protocol. A serial ATA control circuit controls operation of the serial ATA physical layer. A serial ATA multiplexer outputs a serial ATA signal and has a plurality of input lines for receiving input data and a control input that communicates with the serial ATA control circuit. A serial ATA analog front end includes a first differential driver that communicates with the serial ATA multiplexer and provides a first gain to the serial ATA signal and a serial ATA pre-emphasis circuit that provides pre-emphasis to the serial ATA signal to alter a transmission characteristic of the serial ATA signal.

In other features, the serial ATA physical layer is implemented in a serial ATA device or a serial ATA host. The first differential driver generates a first amplified signal. The pre-emphasis circuit includes a first delay element that delays the first amplified signal to generate a first delayed signal, a second driver that amplifies the first delayed signal using a second gain to generate a second amplified signal, and a first summing circuit that adds the first amplified signal and the second amplified signal to generate a sum.

In yet other features, the pre-emphasis circuit further includes a second delay element that delays the second amplified signal to generate a second delayed signal. A third driver amplifies the second delayed signal using a third gain to generate a third amplified signal. The summing circuit adds the third amplified signal to the sum.

In still other features, the pre-emphasis circuit further includes a third delay element that delays the third amplified signal to generate a third delayed signal. A fourth driver amplifies the third delayed signal using a fourth gain to generate a fourth amplified signal. The summing circuit adds the fourth amplified signal to the sum.

In other features, the first, second and third delay elements provide at least one of unit delays and partial unit delays. The multiplexer receives L input lines at x frequency and outputs the first serial ATA signal at L*x frequency. L*x is greater than 1.4 GHz.

In other features, the first differential driver includes a gain control circuit that controls the first gain. n differential amplifiers have differential inputs that communicate with first and second inputs, differential outputs that communicate with first and second outputs, and enable inputs that communicate with the gain control circuit. The gain control circuit selectively enables the n differential amplifiers to adjust the first gain.

The second differential driver includes a pre-emphasis gain control circuit that controls the second gain. m differential amplifiers have differential inputs that communicate with first and second inputs, differential outputs that communicate with first and second outputs, and enable inputs that communicate with the pre-emphasis gain control circuit. The pre-emphasis gain control circuit selectively enables the m differential amplifiers to adjust the second gain.

In still other features, the communications channel has a band-limiting transmission characteristic. The pre-emphasis circuit compensates for the band-limiting transmission characteristic. The pre-emphasis circuit adjusts delays of the first and second delay elements and the first and second gains based on a selected communication channel medium.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1A:
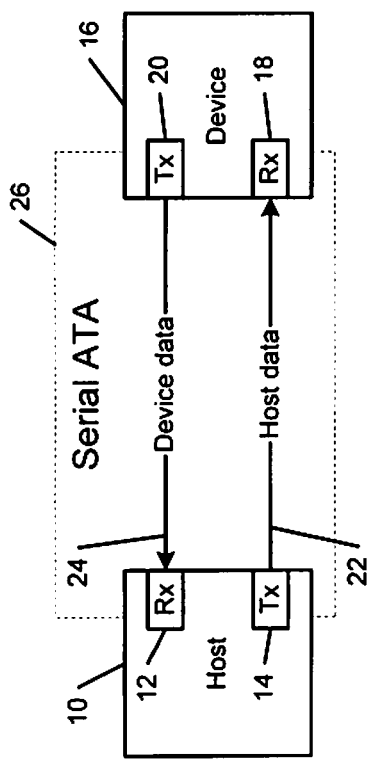
FIG. 1A is a functional block diagram of a host and a device with a connection based on the SATA standard according to the prior art.
Figure 1B:
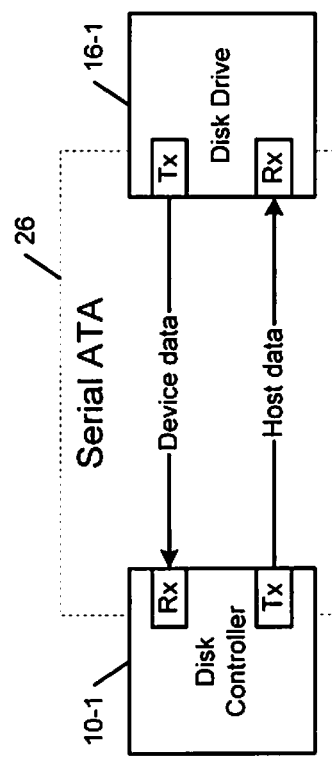
FIG. 1B is a functional block diagram of a disk controller (host) and a disk drive (device) with a connection based on the SATA standard according to the prior art.
Figure 1C:
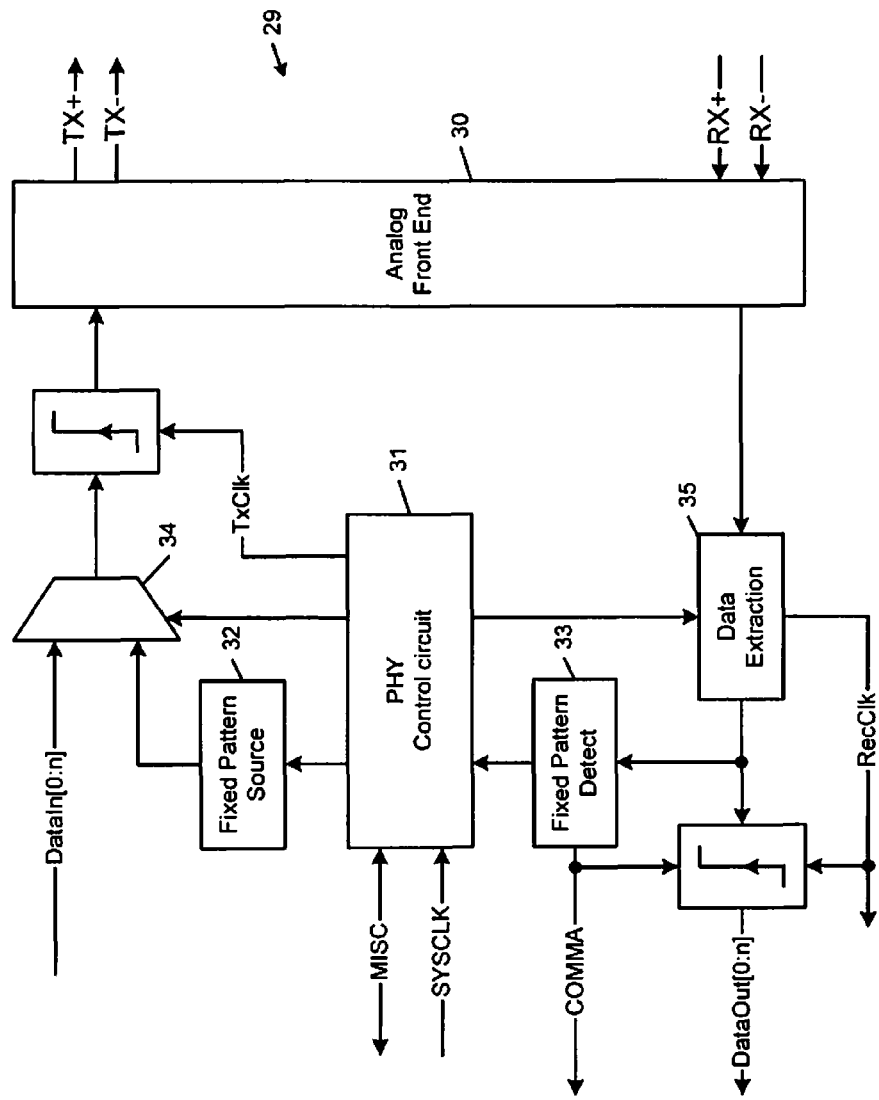
FIG. 1C is a functional block diagram of a serial ATA physical layer according to the prior art.
Figure 2:
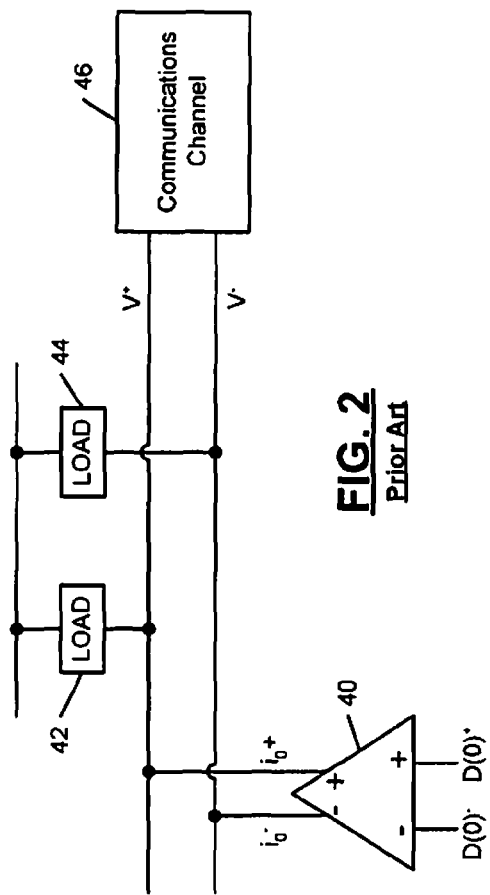
FIG. 2 is a functional block diagram of a differential driving device for the transmitter of the host and/or the device according to the prior art.
Figure 3:
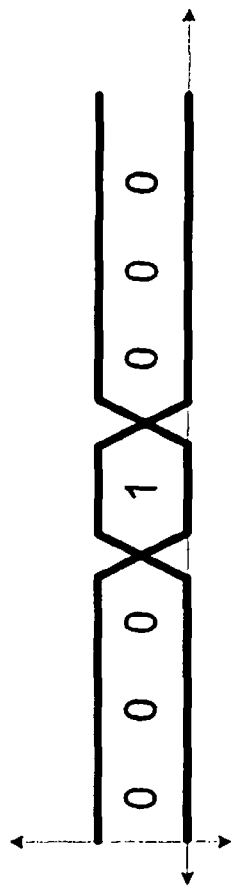
FIG. 3 illustrates a differential voltage waveform at the receiver end of an ideal communications channel.
Figure 4:
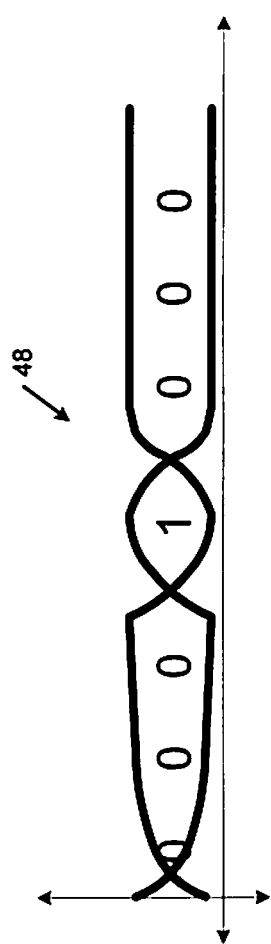
FIG. 4 illustrates a differential voltage waveform at the receiver end of a band-limited communications channel.

The following description of the embodiment(s) is merely exemplary in nature and is in no way intended to be limiting. For purposes of clarity, the same reference numbers will be used in the drawings to identify similar elements.

Figure 6:
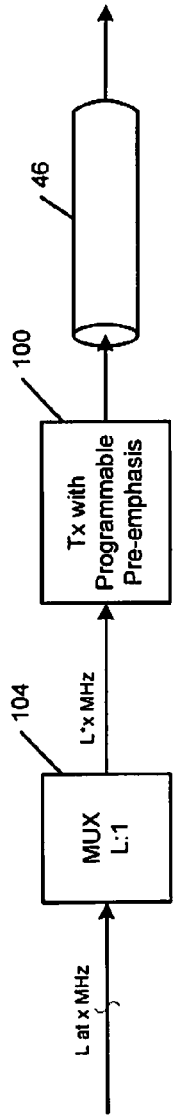
FIG. 6 is a functional block diagram of a transmitter with programmable pre-emphasis according to the present disclosure for a serial ATA channel.

Referring now to FIG. 6, a transmitter 100 with programmable pre-emphasis according to the present disclosure for a serial ATA channel is shown. Data is received by a multiplexer 104 on L lines each at x MHz. For example, current serial ATA standards specify L=10 and x=150 MHz, although other numbers of input lines and higher or lower data rates are contemplated. The multiplexer 104 outputs data at L*x MHz. The transmitter 100 provides programmable pre-emphasis based on transmission characteristics of the communications channel 46 to reduce receiver error rates. For example, the transmitter 100 may provide pre-emphasis to offset band-limiting characteristics of the communications channel 46. Because the pre-emphasis is programmable, the transmitter 100 can be readily adapted to the particular transmission characteristics of other communications channels 46.

Figure 7:
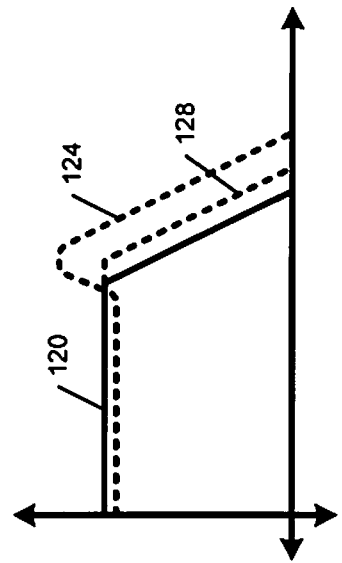
FIG. 7 illustrates a transmission characteristic of a band-limited channel before pre-emphasis, an exemplary pre-emphasis transmission characteristic, and a transmission characteristic after pre-emphasis.
Figure 5:
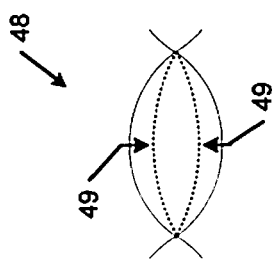
FIG. 5 illustrates a closing "eye"-shaped waveform as the band limiting characteristics of a communications channel increase.

Referring now to FIG. 7, a transmission characteristic of a band-limited channel before pre-emphasis is shown generally at 120. A pre-emphasis transmission characteristic is shown at 124. The resulting or combined signal is shown at 128. As a result of the pre-emphasis in this example, the eye-shaped waveform 48 in FIG. 5 is opened, which improves data error rates of the receiver at the opposite end of the communications channel 46. As can be appreciated, the transmission characteristic and the pre-emphasis will vary for other types of communications channels 46.

Figure 8:
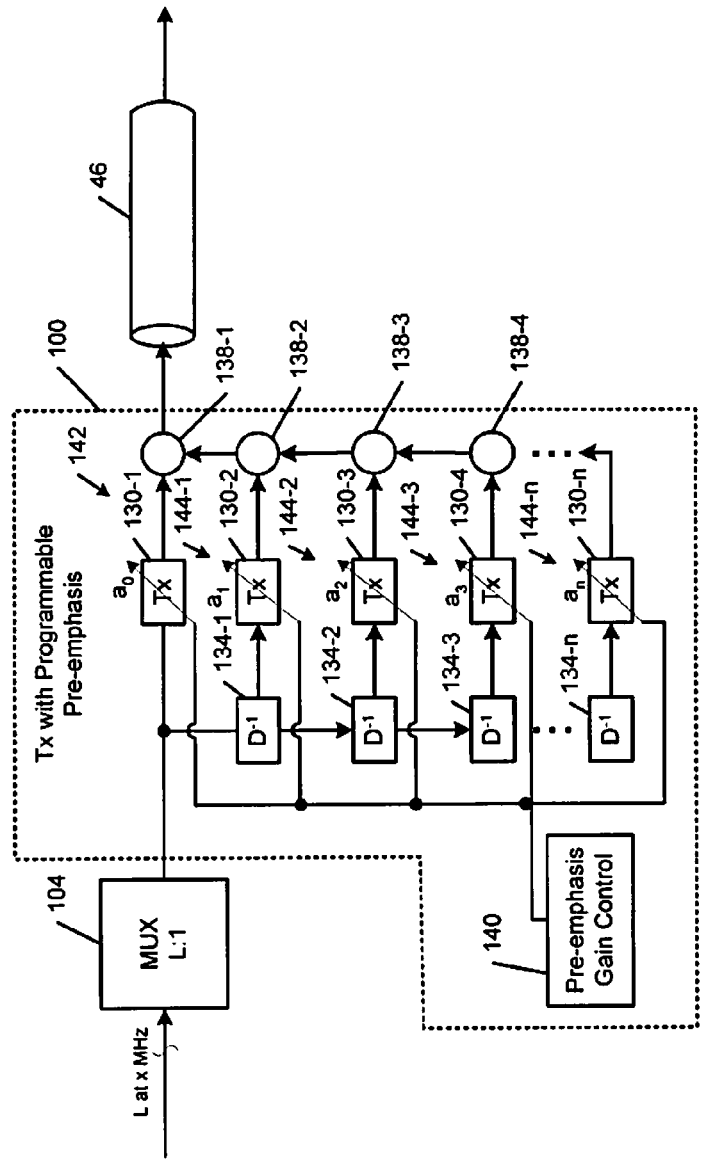
FIG. 8 is a functional block diagram of the transmitter of FIG. 6 in further detail.

Referring now to FIG. 8, the transmitter 100 includes driving devices 130-1, 130-2, 130-3, 130-4, . . . , and 130-n, delay elements 134-1, 134-2, 134-3, . . . , and 134-n, summing circuits 138-1, 138-2, 138-3, . . . , and 138-n, and a pre-emphasis gain control circuit 140. The data output by the multiplexer 104 is input to the driving device 130-1, which provides a first gain $a_0$, and to a delay chain including the delay elements 134-1, 134-2, . . . , and 134-n.

An output of the delay element 134-1 is input to the driving device 130-2, which provides a second gain $a_1$. The output of the delay element 134-1 is also output to the delay element 134-2. An output of the delay element 134-2 is input to the driving device 130-3, which provides a third gain $a_2$. The output of the delay element 134-2 is also input to the delay element 134-3. An output of the delay element 134-3 is input to the driving device 130-4, which provides a fourth gain $a_3$. The output of the delay element 134-3 is also input to the delay element 134-n. An output of the delay element 134-n is input to the driving device 130-n, which provides a gain $a_n$.

Outputs of the driving device 130-n and the driving device 130-4 are input to the summer 138-4. Outputs of the driving device 130-3 and the summer 138-4 are input to the summer 138-3. Outputs of the driving device 130-2 and the summer 138-3 are input to the summer 138-2. Outputs of the driving device 130-1 and the summer 138-2 are input to the summer 138-1. An output of the summer 138-1 is transmitted over the communications channel 46 to the receiver at the opposite end of the communications channel 46. While two-input summing circuits 134-1, 134-2, 134-3, . . . , and 134-n are shown, summing circuits with three or more inputs can also be used to reduce the number of summing circuits 134.

While the circuit shown in FIG. 8 includes a primary stage 142 and three or more pre-emphasis stages 144-1, 144-2, 144-3 . . . , and 144-n (generally identified 144), the transmitter 100 can include the primary stage 142 and one or more pre-emphasis stages 144. The number of pre-emphasis stages 144 that are used for a particular design will depend on the accuracy of the impulse response that is desired and the desired cost of the circuit. Increasing the number of pre-emphasis stages 133 generally increases the cost of the transmitter 100.

The transmitter 100 that is shown in FIG. 8 implements the transfer function set forth below:

$$\text{Output} = a_0 + a_1 z^{-1} + a_2 z^{-2} + \ldots + a_n z^{-n}$$

Figure 9A:
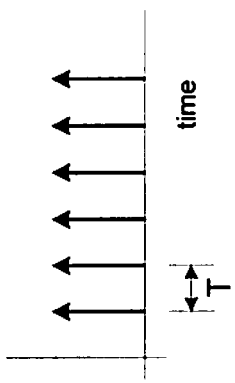
FIGS. 9A-9C are waveforms for multi-clocking.
Figure 9B:
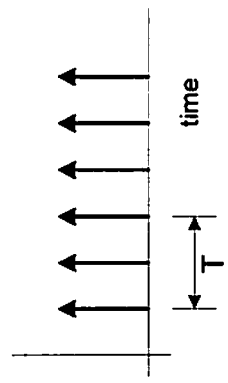
Figure 9C:
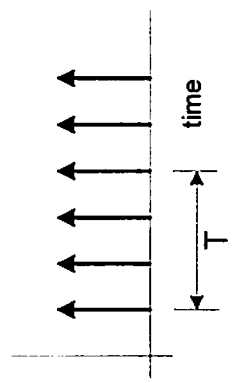

While the foregoing example illustrates terms with unit delay elements, fractional delay elements can also be used. Referring now to FIGS. 9A-9C, using multi-clocking, the terms can be delayed for partial periods, such as T/2, T/3, . . . , or T/N. An example with three pre-emphasis terms and partial periods is as follows:

$$\text{Output} = a_0 + a_1 z^{-1/2} + a_2 z^{-1} + a_3 z^{-3/2}$$

In addition, the pre-emphasis stages 144 can be limited to odd delays, even delays or any other combination using additional delay elements. For example, $$\text{Output} = a_0 + a_1 z^{-1} + a_3 z^{-3} + a_5 z^{-5}$$

The gains $a_0$, $a_1$, $a_2$, . . . , and $a_n$ can be positive, zero or negative, and not limited to integer values. Still other variations will be apparent to skilled artisans.

Figure 10:
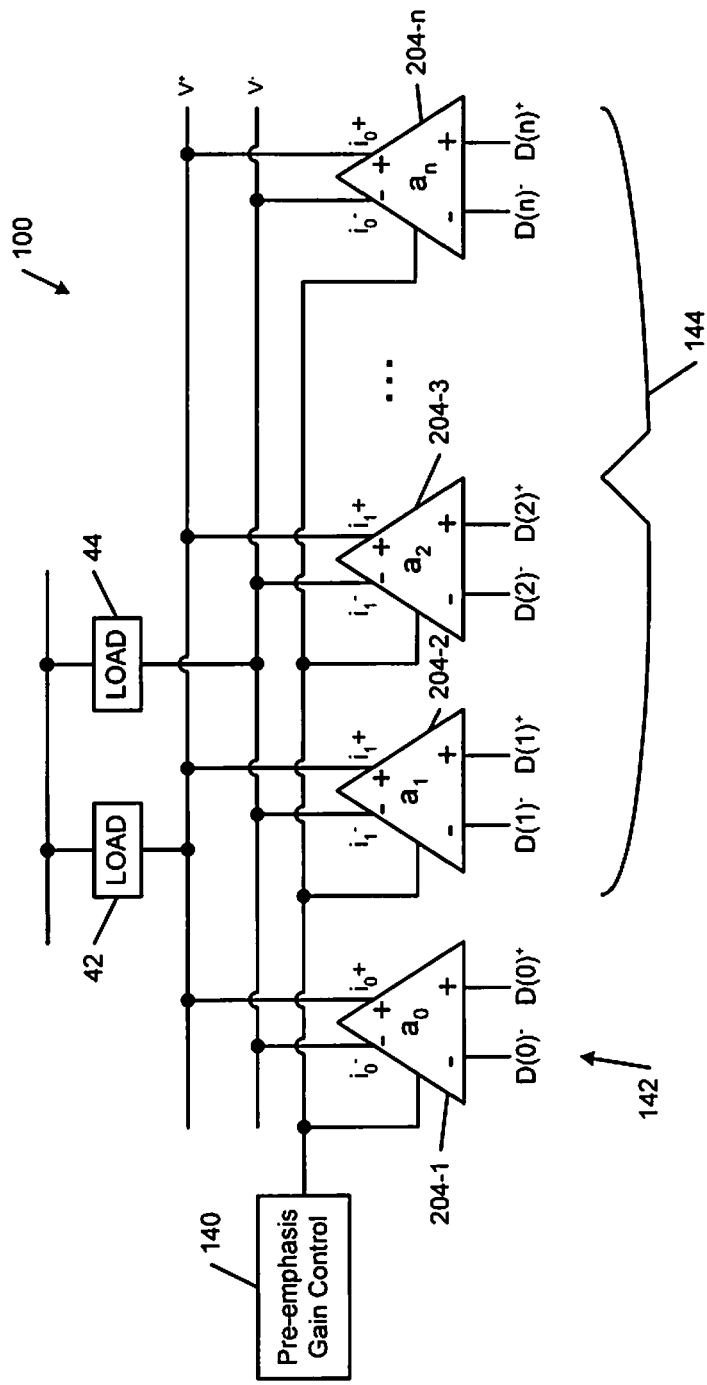
FIG. 10 is a functional block diagram of exemplary driving devices with programmable gain.
Figure 11:
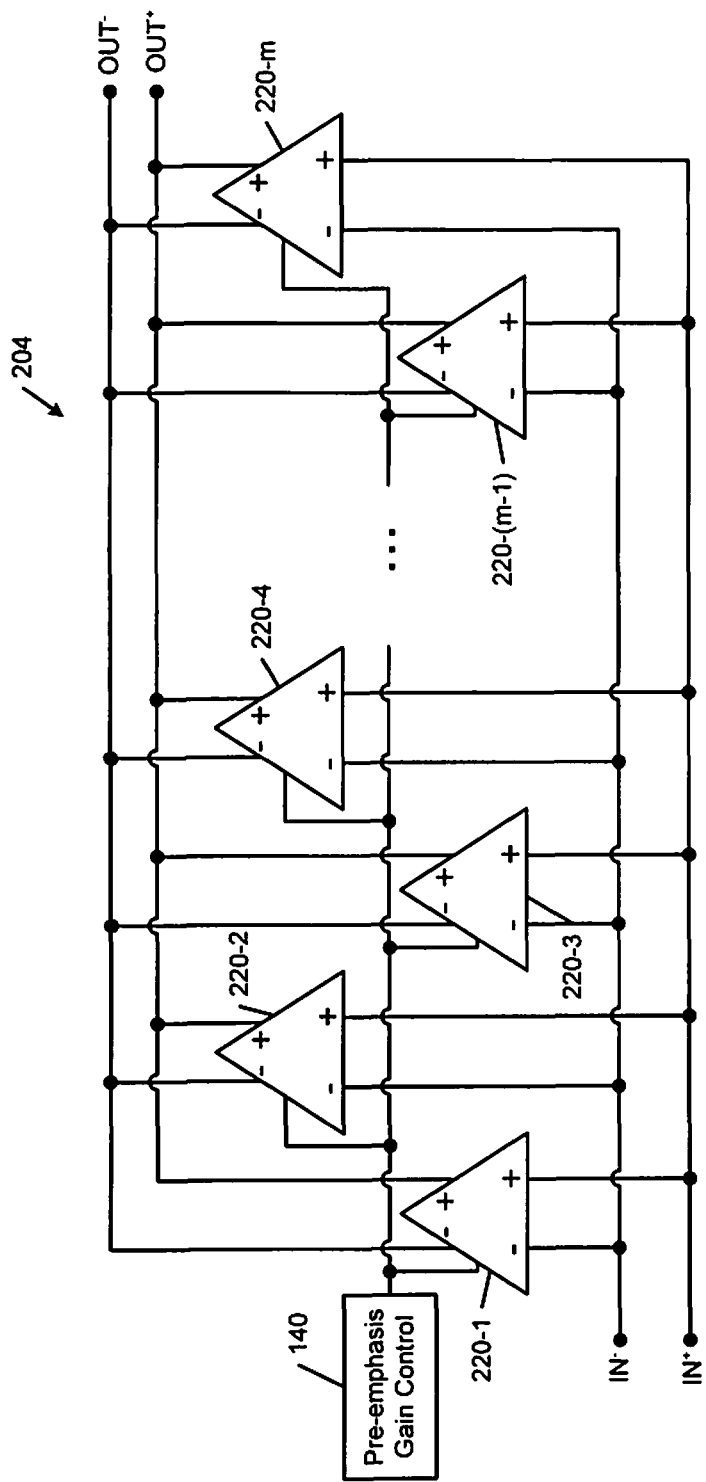
FIG. 11 is a functional block diagram of one of the driving devices of FIG. 10.

Referring now to FIGS. 10 and 11, an exemplary transmitter 100 is shown and includes main and pre-emphasis stages 142 and 144, respectively. Data D(0) is input to a main driving device 164-1 which provides the first gain $a_0$. Delayed data D(1), D(2), . . . , and D(n) are input to driving devices 204-2, 204-3, . . . , 204-n, respectively, having the gains $a_1$, $a_2$, . . . , and $a_n$, respectively. The pre-emphasis gain control circuit 140 adjusts the gain of the data D(0) and the delayed data D(1), D(2), . . . and D(n) to provide a desired transmission characteristic. The desired transmission characteristics of various different media can be determined in advanced and stored in the pre-emphasis gain control circuit 140. Dip adjusts and/or software adjusts can be used to select the gain settings and delays for the particular medium being used.

Referring now to FIG. 11, one of the driving devices 204 is illustrated in further detail. Each driving device 164 includes one or more differential amplifiers 220-1, 220-2, 220-3, . . . , 220-m having inputs coupled to input lines IN⁺ and IN⁻ and outputs coupled to output lines OUT and OUT. The driving devices 204 of the transmitter 100 may have different numbers of differential amplifiers 220 as needed. The pre-emphasis gain control circuit 210 increases or decreases gain by enabling or disabling one or more differential amplifiers 220.

By providing programmable pre-emphasis, the transmitter 100 works with media having different transmission characteristics. With pre-emphasis, the transmitter provides compensation for degradation that occurs during transmission over the communications channel to reduce receiver error rates.

Those skilled in the art can now appreciate from the foregoing description that the broad teachings of the present disclosure can be implemented in a variety of forms. Therefore, while implementations have been described in connection with particular examples thereof, the true scope of the disclosure should not be so limited since other modifications will become apparent to the skilled practitioner upon a study of the drawings, the specification and the following claims.

What is claimed is:

1. A circuit comprising:
   a plurality of delay stages configured to provide a plurality of delayed versions of a first signal;
   a plurality of gain stages configured to receive the plurality of delayed versions of the first signal, wherein each of the plurality of gain stages provides an amount of gain for a corresponding one of the plurality of delayed versions of the first signal, and wherein the plurality of delay stages and the plurality of gain stages are configured to provide pre-emphasis to the first signal; and
   a first summer configured to output a second signal based on the plurality of delayed versions of the first signal, wherein the second signal includes the pre-emphasis.

2. The circuit of claim 1, wherein:
   the first signal comprises serial data; and
   the second signal comprises pre-emphasized serial data.

3. The circuit of claim 1, wherein the plurality of delay stages are connected in series, such that each successive one of the plurality of delay stages provides additional delay to the first signal.

4. The circuit of claim 1, wherein:
   the plurality of delay stages comprise respective outputs; and
   the plurality of gain stages are configured to respectively receive the outputs of the plurality of delay stages.

5. The circuit of claim 1, wherein each of the plurality of gain stages comprises a respective one of a plurality of amplifiers, wherein each of the plurality of amplifiers is configured to amplify a corresponding one of the plurality of delayed versions of the first signal to provide the amount of gain for the corresponding one of the plurality of gain stages.

6. The circuit of claim 1, further comprising an amplifier configured to generate a third signal based on the first signal,
the first summer is configured to output the second signal based on the third signal.

7. The circuit of claim 1, wherein the first summer is configured to output the second signal based on (i) the first signal, and (ii) the plurality of delayed versions of the first signal.

8. The circuit of claim 1, wherein each of the delayed versions of the first signal has a different amount of delay than other ones of the delayed versions of the first signal.

9. The circuit of claim 1, further comprising a second summer, wherein:
the plurality of delay stages comprise a first delay stage and a second delay stage;
the plurality of gain stages comprise a first gain stage, a second gain stage and a third gain stage;
the first signal includes serial data;
the serial data includes first data, second data and third data;
the first delay stage delays the second data;
the second delay stage delays the third data;
the first gain stage provides gain for the first data;
the second gain stage provides gain for the second data;
the third gain stage provides gain for the third data;
the second summer sums (i) an output of the second gain stage, and (ii) an output of the third gain stage; and
the first summer sums (i) an output of the first gain stage, and (ii) an output of the second summer.

10. The circuit of claim 1, wherein the plurality of gain stages are configured to amplify the delayed versions of the first signal such that (i) signal magnitudes at certain frequencies are amplified, and (ii) signal magnitudes at other frequencies are attenuated.

11. The circuit of claim 1, further comprising a multiplexer configured to (i) receive a plurality of signals, and (ii) output the first signal based on a selected one of the plurality of signals, wherein:
the first signal comprises a plurality of frequencies and has a respective signal magnitude at each of the plurality of frequencies,
the plurality of gain stages amplify the plurality of delayed versions of the first signal such that (i) signal magnitudes at certain ones of the plurality of frequencies are amplified, and (ii) signal magnitudes at other ones of the plurality of frequencies are attenuated.

12. The circuit of claim 1, further comprising a selector configured to adjust the amounts of gain for the plurality of gain stages.

13. The circuit of claim 12, further comprising a transmitter, wherein:
the transmitter comprises the plurality of delay stages, the plurality of gain stages and the first summer; and
the selector is preprogrammed based on at least (i) data stored in memory, or (ii) data input to a physical layer of the transmitter.

14. The circuit of claim 1, wherein:
the plurality of delay stages and the plurality of gain stages provide the pre-emphasis to offset a characteristic of a channel; and
the characteristic of the channel includes frequency dependent noise.

15. The circuit of claim 1, further comprising a selector configured to, based on a characteristic of a channel, select a first gain value and a second gain value, wherein:
the plurality of delay stages comprise a first delay stage;
the plurality of gain stages comprise a first amplifier and a second amplifier;
the first amplifier is configured to, based on the first gain value, amplify the first signal to generate a first amplified signal;
the first delay stage is configured to delay the first signal to generate a first delayed version of the first signal; and
the second amplifier configured to, based on the second gain value, amplify the first delayed version of the first signal to generate a second amplified signal,
wherein the first summer is configured to sum the first amplified signal and the second amplified signal to generate the second signal output from the first summer.

16. A method comprising:
providing a plurality of delayed versions of a first signal via a plurality of delay stages;
providing pre-emphasis to the first signal including receiving the plurality of delayed versions of the first signal via a plurality of gain stages, wherein each of the plurality of gain stages provides an amount of gain for a corresponding one of the plurality of delayed versions of the first signal; and
outputting a second signal based on the plurality of delayed versions of the first signal, wherein the second signal includes the pre-emphasis.

17. The method of claim 16, wherein:
the first signal comprises serial data; and
the second signal comprises pre-emphasized serial data.

18. The method of claim 16, wherein each of the delayed versions of the first signal has a different amount of delay than other ones of the delayed versions of the first signal.

19. The method of claim 16, further comprising amplifying each of the plurality of delayed versions of the first signal to provide the amounts of gain for the plurality of gain stages.

20. The method of claim 16, further comprising:
receiving a plurality of signals;
outputting the first signal based on a selected one of the plurality of signals,
wherein the first signal comprises a plurality of frequencies and has a respective signal magnitude at each of the plurality of frequencies; and
amplifying the plurality of delayed versions of the first signal such that (i) signal magnitudes at certain ones of the plurality of frequencies are amplified, and (ii) signal magnitudes at other ones of the plurality of frequencies are attenuated.

\* \* \* \* \*